United States Patent
Schuplin

[11] 3,720,395
[45] March 13, 1973

[54] CLIP FOR SECURING CONDUIT BOXES TO METAL DRY WALL STUDS

[75] Inventor: Jerome T. Schuplin, Parma Heights, Ohio

[73] Assignee: Fastway Fasteners, Inc., Lorain, Ohio

[22] Filed: Aug. 18, 1971

[21] Appl. No.: 172,842

[52] U.S. Cl..................248/205 R, 220/3.9, 248/229
[51] Int. Cl. ...............................................H02g 3/08
[58] Field of Search ...248/205 R, 226 E, 226 R, 228, 248/229, 72, 300, 221; 220/3.9; 24/81 B

[56] References Cited

UNITED STATES PATENTS

| | | | |
|---|---|---|---|
| 3,606,223 | 9/1971 | Havener | 248/205 R |
| 2,456,553 | 12/1948 | Churchill | 248/72 |
| 2,504,086 | 4/1950 | Peters | 24/81 B |
| 3,588,019 | 6/1971 | Cozeck | 248/228 |
| 3,599,916 | 8/1971 | Szabo | 248/226 E |
| 3,536,281 | 10/1970 | Meehan et al. | 248/223 X |
| 3,131,447 | 5/1962 | Turnerman | 24/81 B |

Primary Examiner—J. Franklin Foss
Attorney—William Isler et al.

[57] ABSTRACT

A one-piece clip is provided which can be quickly and easily secured to the flange of a channel stud and to a conduit box without the aid of fastening means other than that which is an integral part of the clip. The clip has incorporated therein means for compensating for dimensional differences in parts of the stud, and barb-like means for engaging the web of the stud and the side walls of the conduit box to aid in preventing displacement of the clip relatively to the stud and box.

12 Claims, 5 Drawing Figures

INVENTOR.
JEROME T. SCHUPLIN
BY
ATTORNEYS

INVENTOR.
JEROME T. SCHUPLIN

BY
Isler & Ornstein
ATTORNEYS

CLIP FOR SECURING CONDUIT BOXES TO METAL DRY WALL STUDS

This invention relates generally to clip or clamps, but has reference more particularly to clips of the type used for securing electrical conduit boxes to metal studs.

Various clips, clamps or the like have been used for securing electrical conduit boxes to metal dry wall studs, but in most cases, the clips or clamps are secured to both flanges of the stud, and installation is not only difficult and time-consuming, but no provision is made to compensate for dimensional differences in the stud.

Exemplary of patents disclosing such clips or clamps are U.S. Pat. Nos. 1,930,242; 3,360,151; 3,474,994.

The present invention has as its primary object the provision of a clip of the character described, made from a single piece of sheet metal or strip, which can be quickly and easily secured to the flange of a channel stud and to the conduit box, without the aid of fastening means, other than that which is an integral part of the clip.

Another object of the invention is to provide a clip of the character described having incorporated therein, as a unitary part thereof, means for compensating for dimensional differences in the width of the flange of the stud and the lip of the flange.

A further object of the invention is to provide a clip of the character described having barb-like means for engaging the web of the stud and the side wall of the conduit box, whereby to aid in preventing displacement of the clip relatively to said web and side wall.

Other objects and advantages of my invention will be apparent during the course of the following description.

In the accompanying drawing, formaing a part of this specification, and in which like numerals are employed to designate like parts throughout the same, FIG. 1 is a side elevational view of a clip embodying the invention;

Figure 4:
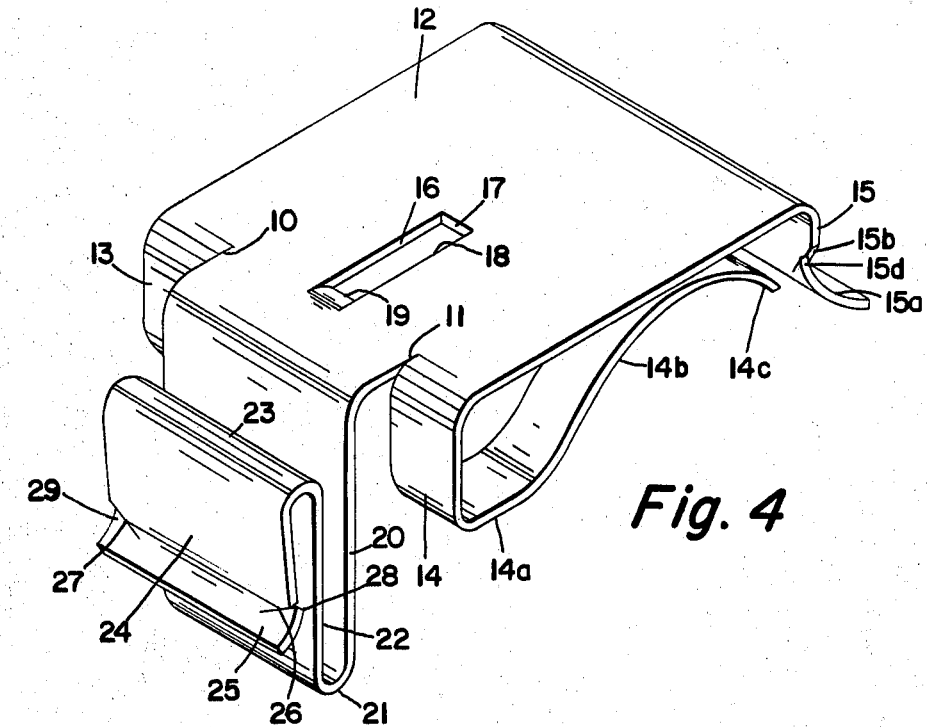
FIG. 4 is a perspective view of the clip.
Figure 5:
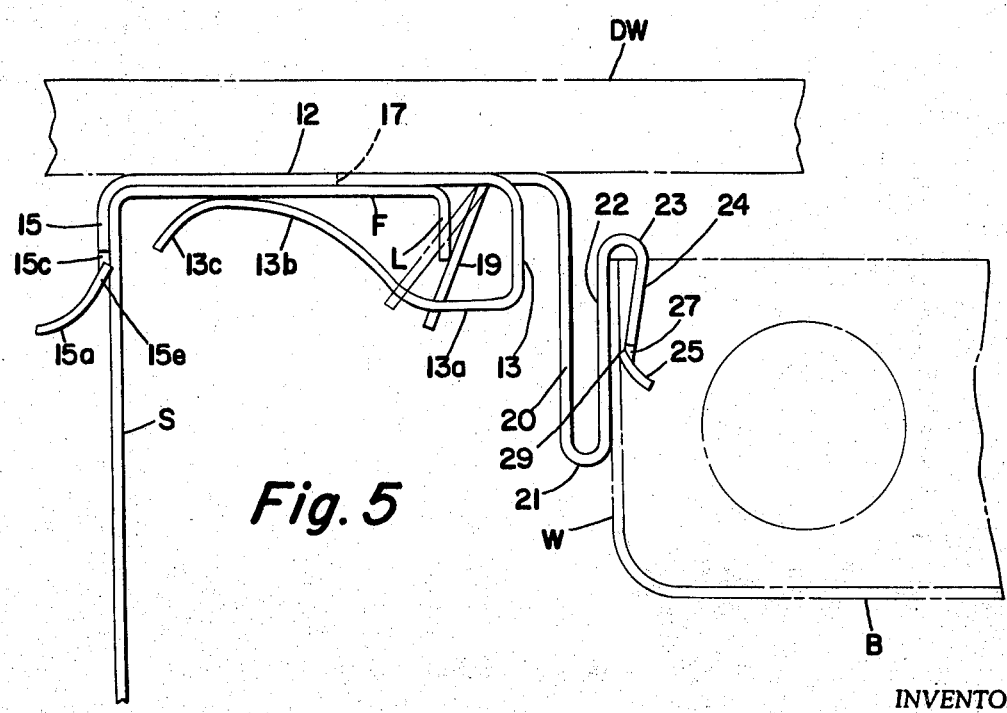
FIG. 5 is view showing the manner in which the clip is attached to the metal stud and to a conduit box.

Referring more particularly to the drawings, the clip is made from a T-shaped blank of sheet metal or strip, preferably heat-treated and spring-tempered steel, which is sheared along parallel lines indicated at 10 and 11 in FIG. 4 to provide a portion which is adapted for securement to the flange F of a channel stud S (see FIG. 5) and a portion which is adapted for securement to the side wall W of a conduit box B (see FIG. 5).

The portion of the clip which is adapted for securement to the flange F of the stud S comprises a body 12 having at one end a pair of downturned laterally-spaced flanges 13 and 14, which are rebent to provide portions 13a and 14a which are disposed in substantially parallel spaced relation to the body 12, and upwardly curved portions 13b and 14b, which terminate in downturned curved lips 13c and 14c.

Figure 1:
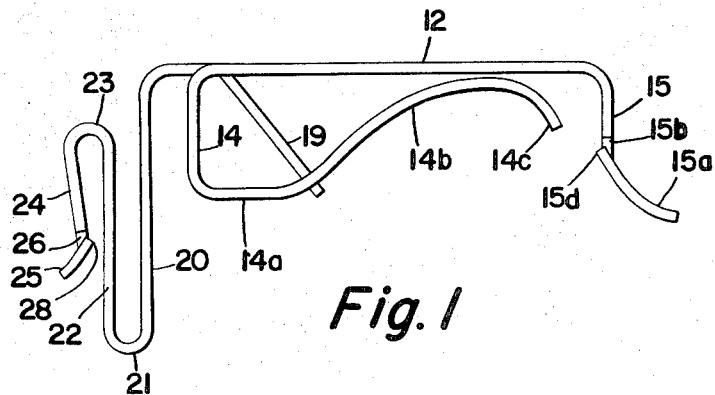
Figure 2:
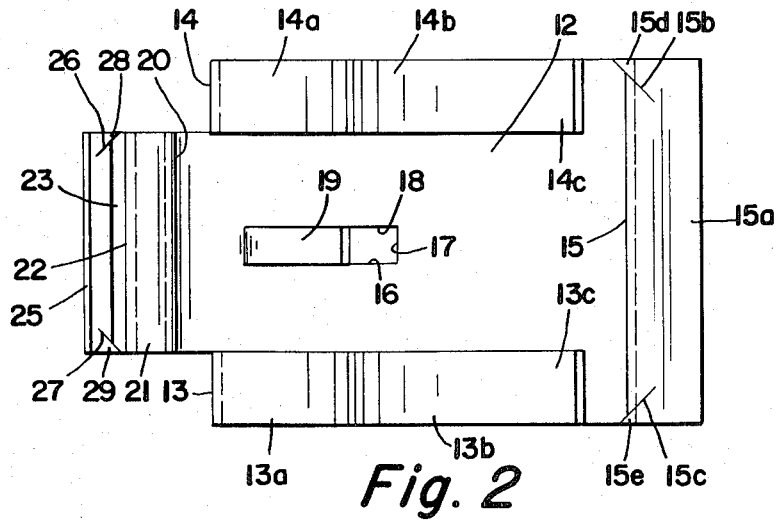
FIG. 2 is a bottom plan view of the clip.
Figure 3:
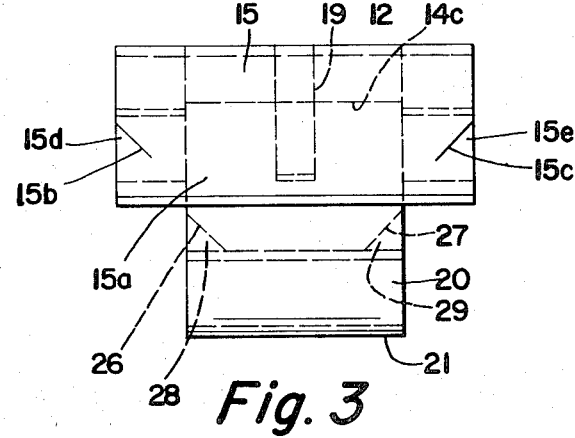
FIG. 3 is an end elevational view of the clip, as viewed from the right end of FIG. 1.

The body 12 is bent at the other end to provide a downturned flange 15 which terminates in a curved end or lip 15a, which is sheared along oblique lines 15b and 15c (FIG. 2) to provide areas which are bent inwardly out of the plane of the flange 15 to form barbs or prongs 15d and 15e, which serve a purpose to be presently described.

The body 12 is also sheared along lines 16, 17 and 18 to provide a narrow rectangular portion or area which is bent downwardly to provide a finger 19 which is inclined to the body 12, and which serves a purpose to be presently described.

The portion of the clip which is adapted for securement to the side wall W of the conduit box B consists of a downturned flange 20 extending from that end of the body 12 which is opposite the flange 15, and is in parallel spaced relation to the plane in which the flanges 13 and 14 lie.

The flange 20 is rebent as at 21 to provide an upwardly extending flange 22 which is substantially parallel with the flange 20, and is, in turn, rebent as at 23 to provide a downwardly extending flange 24, which extends at an angle inwardly towards the flange 22, and terminates in an outward curved end or lip 25.

The curved end or lip 25 is sheared along oblique lines 26 and 27 (FIGS. 2 and 4) to provide areas which are bent inwardly out of the plane of the flange 24 to form barbs or prongs 28 and 29, which serve a purpose to be presently described.

The clip is thus seen to comprise a dual-purpose clip, consisting of one portion supported by the flange 20, and adapted for securement to the flange of a stud, and another portion, also supported by the flange 20, and adapted for securement to the side wall of a conduit box.

In FIG. 5 of the drawings, the dry wall to which the stud S is secured is indicated by reference letters DW, and the lip of the flange F of the stud S by reference letter L.

The clip is installed in a manner which will now be described, with particular reference to FIG. 5.

The flanges 22 and 24 are secured to the side wall W of the conduit box B by means of a hammer or pliers in the position shown in FIG. 5. This securement is faciliated by virtue of the provision of the curved lip 25 of the flange 24. In thus securing the clip to the wall W, the flange 24 is biased from the wall slightly away from the flange 22, and when the clip is in the position shown in FIG. 5, the tendency of the flange 24 to return to its unbiased position causes the barbs or prongs 28 and 29 to bite into the inner surface of the wall W, so that the prongs function to prevent displacement of the clip from the wall W.

Then, holding the conduit box in one hand and the stud S with the other hand, the lip 15a is slipped over the right edge of the flange F (FIG. 5), and the clip is rocked and pushed to the position shown in FIG. 5, in which the flange 15 engages the outer surface of the web of the stud, the body 12 engages the outer surface of the flange F, and the finger 19 bears resiliently against the lower edge of the lip L of the flange F.

As the clip is thus rocked and pushed to the position shown in FIG. 5, the portions 13c and 13b and 14c and 14b of the flanges 13 and 14 respectively are slipped under the lower edge of the lip L of the flange F and moved to the position inside the stud shown in FIG. 5, in which the portions 13b and 14b bear resiliently against the inner surface of the flange F.

In the position shown in FIG. 5, the finger 19 exerts pressure against the lower edge of the lip L of the flange F, due to the fact that it has been resiliently moved from its normal or unbiased position, as shown in broken lines in FIG. 5 to its biased position shown in solid lines. This pressure is effective to cause the barbs or prongs 15d and 15e to bite into the outer surface of the web of the stud S, so that the coaction of these parts with the stud, plus the coaction of the parts 12, and 13b and 14b with the flange F, is effective to prevent displacement of the clip from the stud.

The provision of the finger 19 is an important feature of the invention, since it compensates for dimensional differences in the width of the flanges and lips of studs used in commercial buildings, thus, in effect, adapting the clip for use with studs of different sizes.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In combination with a metal stud having a web and parallel spaced flanges provided with lips disposed in planes substantially parallel with said web, said web, flanges and lips having outer walls, and an electrical conduit box having a side wall; means for securing said conduit box to said stud, said means comprising a one-piece metal clip having a first portion in clamped engagement with said side wall, and a second portion in clamped engagement with a flange of said stud, said second portion having a body engaging the outer wall of said flange and of a length substantially greater than the width of said flange, a flange engaging the outer wall of said web, and a finger extending from said body and inclined toward said web resiliently engaging the edge of the lip of said flange, the resiliency of said finger compensating for dimensional differences in the width of said flange and lip.

2. The combination, as defined in claim 1, wherein said second portion is provided with laterally-spaced flange portions resiliently engaging the inner surface of said flange of said stud.

3. The combination, as defined in claim 1, wherein said finger is struck from the metal of said body and is inclined to the plane of said body.

4. The combination, as defined claim 3, wherein the flange which engages the outer wall of said web is provided with barb-like means which bite into the wall of said web.

5. The combination, as defined in claim 4, wherein said first portion comprises spaced flanges engaging the side wall of the conduit box, one of which flanges is provided with barb-like means which bite into said side wall.

6. The combination, as defined in claim 5, wherein the first and second portions of said clip are interconnected by means of a flange which extends from said body to one of said spaced flanges.

7. A clip for securing an electrical conduit box to the web, flange and lip of a channel-shaped stud, said clip comprising a first portion adapted for clamped engagement with the side wall of said box, and a second portion adapted for clamped engagement with the outer walls of said web, flange and lip of said stud, said second portion having a substantially flat body, a flange depending from one end of said body and adapted to engage the outer wall of said web, and a finger depending from said body and adapted to resiliently engage said lip, whereby to compensate for dimensional differences in the width of said flange and lip.

8. A clip, as defined in claim 7, wherein said second portion is provided with laterally-spaced flange portions extending from said body and adapted for resilient engagement with the inner surface of said stud flange.

9. A clip, as defined in claim 8, wherein said finger is struck from the metal of said body and is inclined to the plane of said body.

10. A clip, as defined in claim 9, wherein the flange which is adapted to engage said web is provided with barb-like means adapted to bite into the wall of said web.

11. A clip, as defined in claim 10, wherein said first portion comprises spaced flanges, one of which is provided with barb-like means adapted to bite into the side wall of said web.

12. A clip, as defined in claim 11, wherein the first and second portions of the clip are interconnected by a flange which extends from said body to one of said spaced flanges.

* * * * *